(12) United States Patent
Kim

(10) Patent No.: US 12,405,120 B2
(45) Date of Patent: Sep. 2, 2025

(54) DEVICE AND METHOD FOR IMPROVING FUEL EFFICIENCY OF FUEL CELL VEHICLE IN UPHILL AND DOWNHILL DRIVING

(71) Applicants: HYUNDAI MOTOR COMPANY, Seoul (KR); Kia Corporation, Seoul (KR)

(72) Inventor: Ki Chang Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 798 days.

(21) Appl. No.: 17/731,602

(22) Filed: Apr. 28, 2022

(65) Prior Publication Data
US 2023/0036318 A1 Feb. 2, 2023

(30) Foreign Application Priority Data

Aug. 2, 2021 (KR) ........................ 10-2021-0101561

(51) Int. Cl.
| | | |
|---|---|---|
| G01C 21/34 | (2006.01) | |
| B60L 58/12 | (2019.01) | |
| B60L 58/30 | (2019.01) | |
| B60W 40/105 | (2012.01) | |
| B60W 40/13 | (2012.01) | |

(52) U.S. Cl.
CPC .......... *G01C 21/3469* (2013.01); *B60L 58/12* (2019.02); *B60L 58/30* (2019.02); *B60W 40/105* (2013.01); *B60W 40/13* (2013.01); *B60W 2510/081* (2013.01); *B60W 2510/085* (2013.01)

(58) Field of Classification Search
CPC ..... G01C 21/3469; B60L 58/30; B60L 58/12; B60W 40/105; B60W 40/13
See application file for complete search history.

(56) References Cited

U.S. PATENT DOCUMENTS

| 9,238,418 B2 | 1/2016 | Ryu et al. |
| 2014/0288737 A1 | 9/2014 | Ryu et al. |
| 2018/0164111 A1* | 6/2018 | Jung ........................ G08G 1/01 |
| 2018/0215283 A1 | 8/2018 | Matsusue et al. |

(Continued)

FOREIGN PATENT DOCUMENTS

| JP | 2003-230203 A | 8/2003 |
| KR | 10-2003-0020982 A | 3/2003 |
| KR | 10-0896216 B1 | 5/2009 |

(Continued)

*Primary Examiner* — Wayne A Langel
(74) *Attorney, Agent, or Firm* — MORGAN, LEWIS & BOCKIUS LLP

(57) ABSTRACT

Disclosed are a device and a method for improving the fuel efficiency of a fuel cell vehicle in uphill and downhill driving. The device may calculate an appropriate stack output to be generated from a fuel cell stack based on the SOC of a battery as well as an uphill altitude at which the vehicle traveling on the uphill road has to travel further to reach the highest altitude when determining the degree of the stack output generated from the fuel cell stack when driving on the uphill road, and may prevent fuel consumption from increasing to generate excessive stack output while driving on an uphill road or the durability of the fuel cell stack from being deteriorated.

20 Claims, 10 Drawing Sheets

(56) References Cited

U.S. PATENT DOCUMENTS

2021/0135257 A1* 5/2021 Jung .................. B60L 3/0053
2023/0215225 A1* 7/2023 Filipowicz ............ B60R 16/023
701/29.6

FOREIGN PATENT DOCUMENTS

| KR | 10-1459464 B1 | 11/2014 |
| KR | 10-1509296 B1 | 4/2015 |
| KR | 10-1574137 B1 | 12/2015 |

* cited by examiner

DEVICE AND METHOD FOR IMPROVING FUEL EFFICIENCY OF FUEL CELL VEHICLE IN UPHILL AND DOWNHILL DRIVING

CROSS-REFERENCE TO RELATED APPLICATION

This application is based on and claims the benefit of priority to Korean Patent Application No. 10-2021-0101561, filed on Aug. 2, 2021, with the Korean Intellectual Property Office, the entire contents of which are incorporated herein by reference.

TECHNICAL FIELD

The present disclosure relates to a device and method for improving the fuel efficiency of a fuel cell vehicle in uphill and downhill driving. The device and method disclosed herein can reduce fuel consumption by minimizing stack output when driving uphill.

BACKGROUND

In general, the stack output of a fuel cell in which hydrogen fuel is consumed in a fuel cell vehicle, such as a hydrogen electric truck, is changed based on a state of charge (SOC) of a battery.

That is, when the state of charge (SOC) of the battery is at a specified level, for example, 70% or more, the vehicle is operated using only the power charged in the battery while the fuel cell stack does not generate electricity to prevent the battery from being charged anymore. Thereafter, when the SOC decreases due to an increase in battery usage, stack power generation is performed again.

In addition, when the SOC decreases as the battery usage increases in the climbing condition of driving on an inclined uphill road, the stack output also increases in proportion to the decrease of the SOC. In particular, when the SOC is lowered to about 35% or less, the stack generates electricity to produce the highest output. As a result, as the fuel cell stack generates high output power, the consumption of hydrogen fuel increases, thereby deteriorating the fuel efficiency.

In addition, when the fuel cell stack generates high electric power, because the amount of heat is increased, the noise is also increased while the cooling parts are operated, so that the fatigue of the driver may be increased. In addition, when the high power generation is continuously repeated, the durability of the fuel cell stack is rapidly deteriorated.

Accordingly, the fuel cell performance of a fuel cell vehicle is increased by minimizing high power generation of the fuel cell stack even when driving on an uphill road that requires more output than when driving on a flat or downhill road, and in addition, there is still a need to provide means that can improve the durability of the fuel cell stack.

SUMMARY

The present disclosure addresses the above-mentioned problems occurring in the prior art while maintaining advantages achieved by the prior art.

An aspect of the present disclosure provides a device and a method for improving the fuel efficiency of a fuel cell vehicle in uphill and downhill driving. The device and method disclosed herein can calculate an appropriate stack output to be generated from a fuel cell stack based on the SOC of a battery as well as an uphill altitude at which the vehicle traveling on the uphill road has to travel further to reach the highest altitude when determining the degree of the stack output generated from the fuel cell stack when driving on the uphill road, and can prevent fuel consumption from increasing to generate excessive stack output while driving on an uphill road or the durability of the fuel cell stack from being deteriorated.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for improving a fuel efficiency of a fuel cell vehicle in uphill and downhill driving includes a driving altitude determination device that estimates an uphill altitude at which a vehicle is to travel up to a highest altitude based on a current driving altitude on an uphill road on which the vehicle travels, and a final stack output determination device that determines a stack output to be generated in a fuel cell stack in order for the vehicle to travel to the highest altitude based on a remaining state of charge, SOC, of a battery and the uphill altitude.

In an embodiment, the final stack output determination device may include a climbing energy estimation device that calculates driving energy required to travel on a remaining uphill road corresponding to the uphill altitude by using a weight of the vehicle as required climbing energy, a climbing stack output calculation device that calculates a remainder of the required climbing energy, excluding battery available energy that is able to be supplied from the battery, as required stack energy, and calculates a required stack output to be generated in the fuel cell stack for travelling on the uphill road by using the required stack energy, and a stack output determination device that compares the calculated required stack output with a basic stack output set to be generated in the fuel cell stack in response to a decrease in an SOC of the battery while travelling on the remaining uphill road, and determine a lower value between the calculated required stack output and the basic stack output as a final stack output to be generated in the fuel cell stack.

In an embodiment, the driving altitude determination device may include a driving altitude estimation device that estimates a level at which the vehicle travels in an altitude range of the uphill road by using the current driving altitude of the vehicle traveling on the uphill road, and an uphill altitude calculation device that calculates the uphill altitude at which the vehicle is to travel from the current driving altitude to the highest altitude on the uphill road.

In an embodiment, the driving altitude estimation device may acquire the current driving altitude of the vehicle from location information of a navigation system obtained by using GPS information, or acquire current driving information of the vehicle based on a change in atmospheric pressure information measured by an atmospheric pressure sensor in the vehicle.

In an embodiment, the driving altitude estimation device may estimate the level at which the vehicle travels in the altitude range of the uphill road by using a normal distribution of altitude information generated based on a number of current driving altitude samples obtained during a specified period.

In an embodiment, the vehicle traveling on the uphill road is driven along a route that includes a charging station.

In an embodiment, the vehicle travelling on the uphill road may include a fuel cell vehicle.

In an embodiment, the climbing energy estimation device may include a vehicle weight estimation device that estimates the weight of the vehicle by using a gradient of the uphill road and an average fuel efficiency of the vehicle, and a required climbing energy calculation device that calculates the driving energy required for the vehicle having the estimated weight to reach the highest altitude by traveling on the remaining uphill road at the current driving altitude as the required climbing energy.

In an embodiment, the vehicle weight estimation device may estimate the weight of the vehicle based on altitude information of the uphill road on which the vehicle travels and the average fuel efficiency of the vehicle traveling on the uphill road.

In an embodiment, the vehicle weight estimation device may calculate the weight of the vehicle by dividing a value by a remaining component excluding the weight of the vehicle among a rolling resistance and an inclination resistance, wherein the value is obtained by subtracting an air resistance after dividing the vehicle driving energy calculated based on the average fuel efficiency and a mileage of the vehicle by the mileage.

In an embodiment, the required climbing energy calculation device may use the uphill altitude calculated by the driving altitude determination device, an average gradient of the uphill road, an average speed and the weight of the vehicle to calculate a vehicle driving energy required for the vehicle to travel along a remaining uphill road from the current driving altitude to the highest altitude as the required climbing energy.

In an embodiment, the climbing stack output calculation device may include a battery available energy calculation device that calculates available battery energy, which is capable of being supplied from the battery while the vehicle climbs the remaining uphill road, based on the SOC of the battery, a required stack energy calculation device that calculates a remainder obtained by subtracting the available battery energy from the required climbing energy calculated by the climbing energy estimation device as the required stack energy to be generated in the fuel cell stack, and a required stack output calculation device that calculates the required stack output by dividing the required stack energy by an estimated time required to reach the highest altitude when the vehicle travels at an average speed.

According to another aspect of the present disclosure, a method of improving a fuel efficiency of a fuel cell vehicle in uphill and downhill driving includes estimating, by a driving altitude determination device, an uphill altitude at which the vehicle is to travel up to a highest altitude based on a current driving altitude on an uphill road on which the vehicle travels, and determining, by a final stack output determination device, a stack output to be generated in a fuel cell stack in order for the vehicle to travel to the highest altitude based on a remaining state of charge, SOC, of a battery and the uphill altitude.

In an embodiment, the determining of the stack output may include calculating, by a climbing energy estimation device, driving energy required to travel on a remaining uphill road corresponding to the uphill altitude by using a weight of the vehicle as required climbing energy, calculating, by a climbing stack output calculation device, a remainder of the required climbing energy, excluding battery available energy that is able to be supplied from the battery, as required stack energy, and calculating, by the climbing stack output calculation device, a required stack output to be generated in the fuel cell stack for travelling on the uphill road by using the required stack energy, and comparing, by a stack output determination device, the calculated required stack output with a basic stack output set to be generated in the fuel cell stack in response to a decrease in an SOC of the battery while travelling on the remaining uphill road, and determining, by the stack output determination device, a lower value between the calculated required stack output and the basic stack output as a final stack output to be generated in the fuel cell stack.

In an embodiment, the estimating of the uphill altitude may include estimating, by a driving altitude estimation device, a level at which the vehicle travels in an altitude range of the uphill road by using the current driving altitude of the vehicle traveling on the uphill road, and calculating, an uphill altitude calculation device, the uphill altitude at which the vehicle is to travel from the current driving altitude to the highest altitude on the uphill road.

In an embodiment, the estimating of the level may include acquiring, by the driving altitude estimation device, the current driving altitude of the vehicle from location information of a navigation system obtained by using GPS information, or acquiring, by the driving altitude estimation device, current driving information of the vehicle based on a change in atmospheric pressure information measured by an atmospheric pressure sensor in the vehicle.

In an embodiment, the estimating of the level may include estimating, by the driving altitude estimation device, the level at which the vehicle travels in the altitude range of the uphill road by using a normal distribution of altitude information generated based on a number of current driving altitude samples obtained during a specified period.

In an embodiment, the calculating of the driving energy may include estimating, by a vehicle weight estimation device, the weight of the vehicle by using a gradient of the uphill road and an average fuel efficiency of the vehicle, and calculating, by a required climbing energy calculation device, the driving energy required for the vehicle having the estimated weight to reach the highest altitude by traveling on the remaining uphill road at the current driving altitude as the required climbing energy.

In an embodiment, the estimating of the weight of the vehicle may include calculating, by the vehicle weight estimation device, the weight of the vehicle by dividing a value by a remaining component excluding the weight of the vehicle among a rolling resistance and an inclination resistance, wherein the value is obtained by subtracting an air resistance after dividing the vehicle driving energy calculated based on the average fuel efficiency and a mileage of the vehicle by the mileage.

In an embodiment, the calculating of the driving energy may include calculating, by the required climbing energy calculation device, a vehicle driving energy required for the vehicle to travel along a remaining uphill road from the current driving altitude to a highest altitude as the required climbing energy by using the uphill altitude calculated by the estimating of the uphill altitude, an average gradient of the uphill road, an average speed and the weight of the vehicle.

In an embodiment, the calculating of the remainder of the required climbing energy may include calculating, by a battery available energy calculation device, available battery energy, which is capable of being supplied from the battery while the vehicle climbs the remaining uphill road, based on an SOC of the battery, calculating, by a required stack energy calculation device, a remainder obtained by subtracting the available battery energy from the required climbing energy calculated by the climbing energy estimation device as the required stack energy to be generated in the fuel cell stack, and calculating, by a required stack output calculation device, the required stack output by dividing the required stack energy by an estimated time required to reach the highest altitude when the vehicle travels at an average speed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
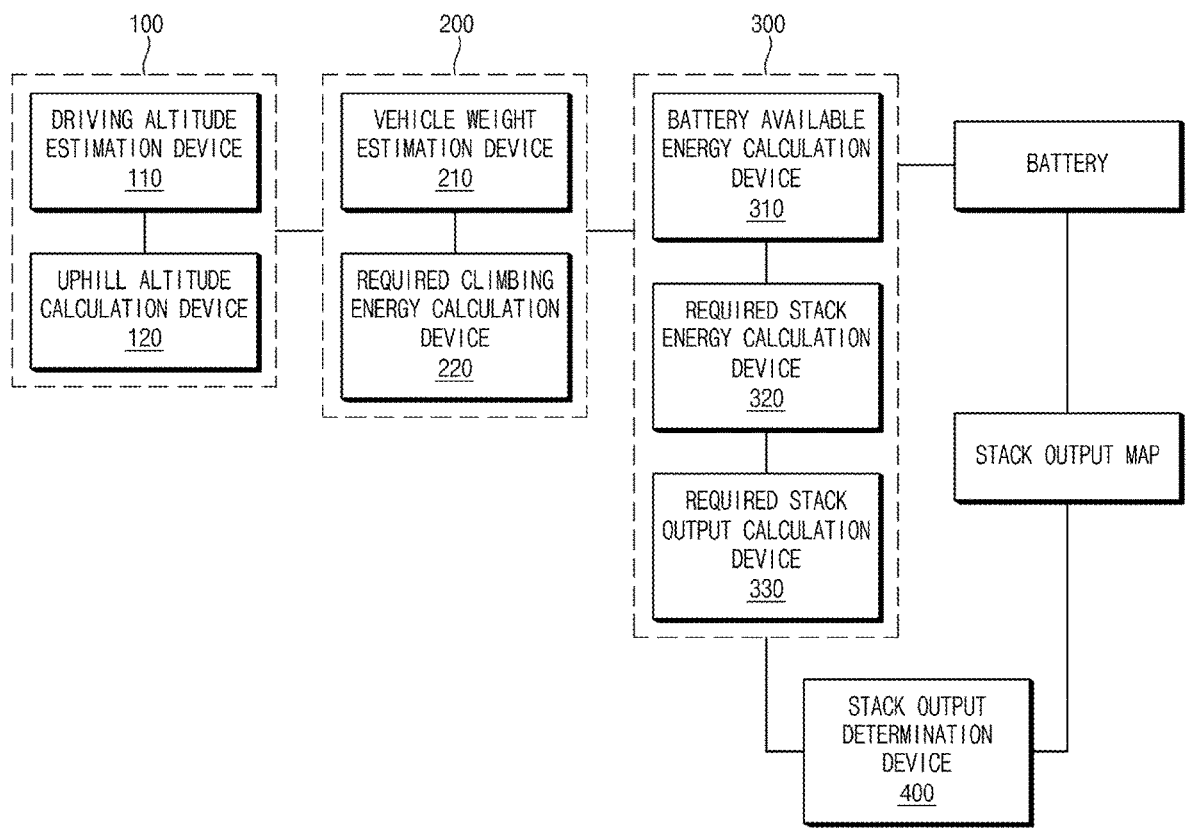
FIG. 1 is a block diagram of a device for improving fuel efficiency of a fuel cell vehicle in uphill and downhill driving according to the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing an embodiment of the present disclosure, a detailed description of the related known configuration or function may not be provided in order not to unnecessarily interfere with the understanding of an embodiment of the present disclosure.

In describing the components of an embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific teams used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The device for improving fuel efficiency of a fuel cell vehicle in uphill and downhill driving according to the present disclosure may include at least one processor performing the various functions of and/or operations by a driving altitude determination device and a final stack output determination device. The driving altitude determination device and the final stack output determination device described below are implemented with software instructions executed on the at least one processor.

The term "uphill" may refer to a direction that leads toward a higher level along a slope and "downhill" may refer to a direction that leads toward a lower level along the slope.

Hereinafter, with reference to FIGS. 1 to 10, embodiments of the present disclosure will be described in detail.

FIG. 1 is a block diagram of a device for improving fuel efficiency of a fuel cell vehicle in uphill and downhill driving according to the present disclosure.

Referring to FIG. 1, a device for improving fuel efficiency of a fuel cell vehicle in uphill and downhill driving according to the present disclosure may include a driving altitude determination device 100 configured to estimate an uphill altitude at which a vehicle is to travel up to a highest altitude based on a current driving altitude on an uphill road on which the vehicle travels, and a final stack output determination device configured to determine a stack output to be generated in a fuel cell stack in order for the vehicle to travel to the highest altitude based on a remaining SOC of a battery and the uphill altitude.

In this case, the final stack output determination device may include a climbing energy estimation device 200 configured to calculate driving energy required to travel on a remaining uphill road corresponding to the uphill altitude by using a weight of the vehicle as required climbing energy, a climbing stack output calculation device 300 configured to calculate a remainder of the required climbing energy, excluding battery available energy that is able to be supplied from the battery, as required stack energy, and calculate a required stack output to be generated in the fuel cell stack for travelling on the uphill road by using the required stack energy, and a stack output determination device 400 configured to compare the calculated required stack output with a basic stack output set to be generated in the fuel cell stack in response to a decrease in an SOC of the battery while travelling on the remaining uphill road, and determine a lower value as a final stack output to be generated in the fuel cell stack.

In this case, the vehicle refers to a fuel cell vehicle that generates electric power using hydrogen in a fuel in a fuel cell stack to charge a battery and drives a motor with the charged power to generate driving power.

Figure 2:
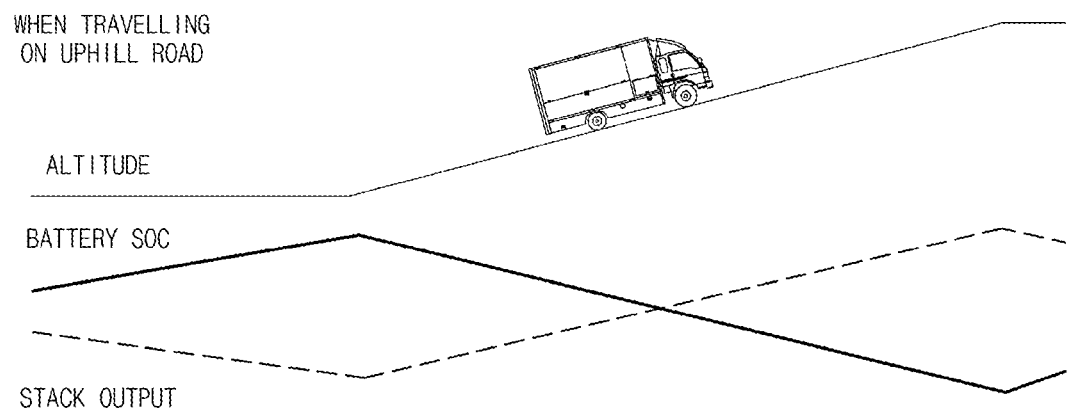
FIG. 2 is an exemplary diagram illustrating the increase/decrease situation of battery power and stack output when driving on a general uphill road.

In general, in the case of a fuel cell vehicle, as shown in FIG. 2, when the SOC of the battery increases while the power generated in the fuel cell stack is charged, the stack output generated in the fuel cell stack decreases. Thereafter, the vehicle is driven mainly depending on the power charged in the battery, and when the SOC of the battery is low, the stack output power is increased again to increase the SOC of the battery. Accordingly, when the vehicle travels on an uphill road that requires a lot of power in a state in which the SOC of the battery is increased while the vehicle drives on flat ground, the vehicle is driven mainly depending on the power of the battery until the battery SOC is lowered to a specified level or less.

However, even after the SOC of the battery is lowered to a specified level or less, when the path for the vehicle to climb up to the highest altitude on the uphill road remains, the power consumed for climbing on the uphill road increases, so that the SOC of the battery is continuously reduced, so the stack output is continuously increased in proportion to the decrease in the SOC of the battery.

In FIG. 2, a graph in which the SOC of the battery increases and decreases under the uphill road on which the vehicle travels is denoted as a thick solid line, and a graph in which the stack output increases and decreases below it is denoted as a dotted line, so it is schematically shown that the SOC of the battery decreases and the stack output increases as the power consumption increases when driving on an uphill road.

After the vehicle reaches the highest altitude of the uphill road and the climbing is completed, the power consumed by the vehicle also decreases and the SOC of the battery increases again, thereby gradually decreasing the stack output.

That is, when the stack output increases or decreases in proportion only to a degree of the decrease of the SOC of the battery, the SOC of the battery decreases as the vehicle approaches the highest altitude when driving on an uphill road, so that it is required to generate the excessive stack output from the fuel cell stack. As a result, the fuel efficiency is lowered and the durability of the fuel cell stack is also rapidly deteriorated when driving on an uphill road is repeated.

Accordingly, the device for improving the fuel efficiency of a fuel cell vehicle in uphill and downhill driving according to the present disclosure may calculate an appropriate stack output to be generated from a fuel cell stack based on the SOC of a battery as well as an uphill altitude at which the vehicle traveling on the uphill road has to travel further to reach the highest altitude when determining the degree of the stack output generated from the fuel cell stack when driving on the uphill road, and thus, may prevent fuel consumption from increasing to generate excessive stack output while driving on an uphill road or the durability of the fuel cell stack from being deteriorated.

To this end, the driving altitude determination device 100 may include a driving altitude estimation device 110 configured to estimate a level at which the vehicle travels in an altitude range of the uphill road by using a current driving altitude of the vehicle traveling on the uphill road, and an uphill altitude calculation device 120 configured to calculate an uphill altitude at which the vehicle is to travel from the current driving altitude to a highest altitude on the uphill road.

In this case, the driving altitude estimation device 110 may acquire the current driving altitude of the vehicle from location information of a navigation system obtained by using GPS information, or acquire the current driving information of the vehicle based on a change in atmospheric pressure information measured by an atmospheric pressure sensor in the vehicle.

In addition, the driving altitude estimation device 110 may estimate the level at which the vehicle travels in the altitude range of the uphill road by using a normal distribution of altitude information generated based on a number of current driving altitude samples obtained during a specified period.

Figure 3:
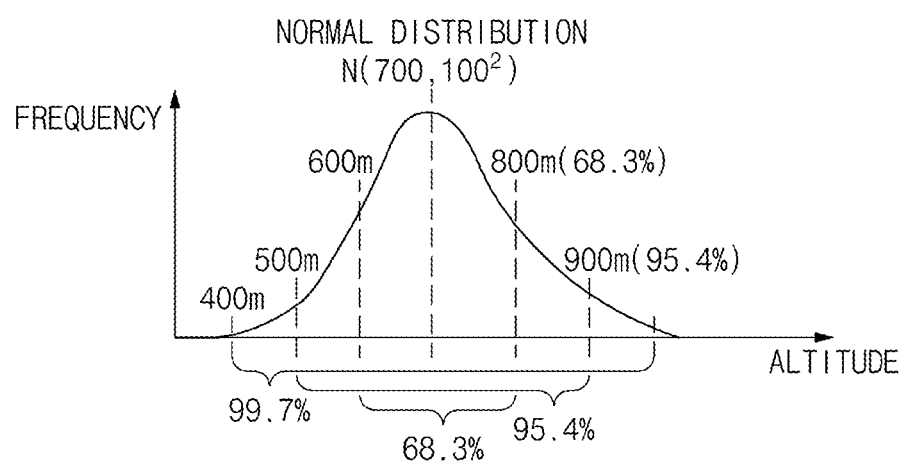
FIG. 3 is an exemplary graph illustrating a normal distribution of altitude information according to an embodiment of the present disclosure.

To this end, as an example of the normal distribution of altitude information, as shown in FIG. 3, the driving altitude estimation device 110 may obtain a plurality of current altitude information samples (e.g., 500 samples) for a specified time period (e.g., the last 3 minutes), and calculate the normal distribution of the altitude information with an expected mean (m) of 700 meters and a standard deviation (σ) of 100 meters based on the samples.

Thereafter, when the driving altitude estimation device 110 additionally acquires the current driving altitude of 650 meters as an input, the expected value, dispersion and standard deviation may be calculated as in following Equation 1.

[Equation 1]

Expected value=(700 meters*499 samples+650 meters*1 sample)/500 samples  (a)

Dispersion=(100 meters²*499 samples+50 meters²*1 samples)/500 samples  (b)

Standard deviation=sqrt (variance)  (c)

Figure 4:
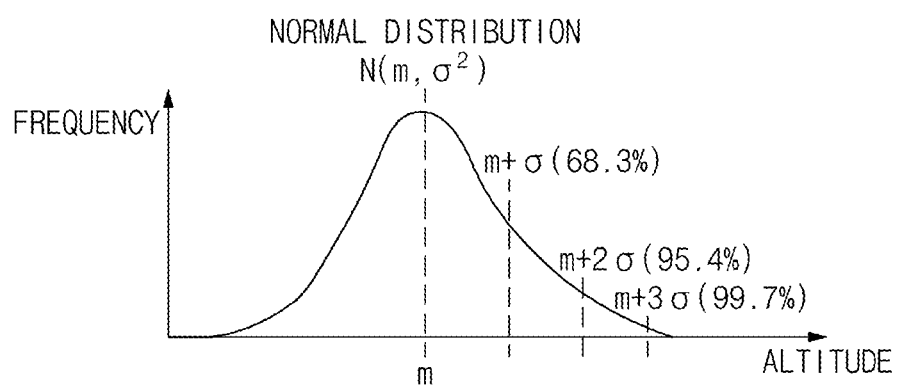
FIG. 4 is an exemplary graph illustrating a normal distribution for estimating the uphill altitude using a normal distribution of altitude information according to an embodiment of the present disclosure.

As an example of such a normal distribution of altitude information, the driving altitude estimation device 110 may use the plurality of current altitude information samples acquired during a specified time period to calculate the normal distribution of altitude information that has an average of 'm' and a standard deviation of 'σ' as shown in FIG. 4. In this case, an altitude corresponding to 3-sigma in the normal distribution of altitude information of FIG. 4 may be assumed as the highest altitude of the uphill road. Therefore, the difference between the current altitude information of the vehicle and the altitude corresponding to the 3-sigma becomes the uphill altitude that the vehicle traveling on the uphill road must climb further to reach the highest altitude.

For example, the altitude corresponding to 99.7% in an altitude range where the expected value is 700 meters and the standard deviation is 100 meters may be calculated as 700+3*100=1000, and the probability that the vehicle traveling on the current uphill road will drive at less than 1000 meters may be determined as 99.7%, so that it may be assumed that the highest altitude is 1,000 meters.

In addition, the uphill altitude calculation device 120 may calculate the difference obtained by subtracting the current driving altitude of the vehicle from the highest altitude assumed by the driving altitude estimation device as the uphill altitude at which the vehicle travelling on the uphill road must travel further from the current location of the vehicle to the highest altitude on the uphill road. That is, the uphill altitude means a difference in altitude between the current altitude of the vehicle and the highest altitude that the vehicle has to climb.

In addition, the driving altitude determination device 100 may establish an altitude information database by setting and storing an altitude range including the lowest and highest altitudes of the uphill road on which the vehicle travels based on the past driving records of the vehicle traveling on the uphill road.

As described above, by establishing the altitude information database by limiting the lowest and highest altitudes of the uphill road on which the vehicle travels, the uphill altitude may be calculated by using the database, and the uphill energy required for the vehicle to drive from the current driving altitude to the highest altitude may be calculated. Accordingly, the embodiments may be suitable for determining the stack output of the fuel cell vehicle such as a bus or a truck that constantly and repeatedly travels a specified driving route around a charging station.

In addition, the climbing energy estimation device 200 may include a vehicle weight estimation device 210 configured to estimate a weight of the vehicle by using a gradient of the uphill road and an average fuel efficiency of the vehicle, and a required climbing energy calculation device 220 configured to calculate the driving energy required for the vehicle having the estimated weight to reach a highest altitude by traveling on the remaining uphill road at the current driving altitude as the required climbing energy.

In this case, the vehicle weight estimation device 210 may estimate the weight of the vehicle by using a two-dimensional map generated based on the altitude information of the uphill road on which the vehicle travels and the average fuel efficiency of the vehicle traveling on the uphill road.

In addition, the average fuel efficiency of the vehicle is mainly affected by the gradient of a road and the loading weight of a vehicle. Accordingly, the vehicle weight estimation device 210 may estimate the weight of the vehicle by using the average fuel efficiency calculated by dividing the average gradient of the uphill road and the amount of hydrogen fuel consumed by the mileage.

In this case, because the hydrogen fuel is converted into vehicle driving energy with an efficiency of about 50%, the vehicle driving energy (E) may be calculated as 50% of the hydrogen consumption energy generated by consuming the hydrogen fuel, or be calculated by multiplying the value obtained by multiplying the average fuel efficiency by the mileage by 0.5. In general, because the hydrogen consumption energy of 1 g of hydrogen corresponds to 120 KJ, for example, when calculating the driving energy by collecting the average fuel efficiency of the vehicle and average gradient every 60 seconds (in the case of an average fuel efficiency of 10 km/kg for 60 seconds, a gradient of 2%, and a driving distance of 1.2 km), it may be understood that 120 g of hydrogen fuel is consumed for driving 1.2 km in case of average fuel efficiency of 10 km/kg, and 7200 kJ of driving energy is generated by 120 g of hydrogen fuel.

In addition, the vehicle driving energy (E) may also be expressed as a relationship between the weight (M) of the vehicle and the mileage as following Equation 2. In this case, in Equation 2, the rolling resistance is proportional to the weight (M) of the vehicle (the proportionality constant is $f_0$), the air resistance is proportional to the speed (v) of the vehicle (the proportionality constant is $f_2$), and the inclination resistance is proportional to the weight (M) of the vehicle and the gradient (θ).

Vehicle driving energy (E)

= Energy consumption due to running resistance+
Potential energy increase/decrease due to altitude change = Running resistance average*Mileage+Inclination resistance average*Mileage = (Rolling resistance average+Air resistance average)*Mileage+Inclination resistance average*Mileage = $(M*g*f_0+f_2*v^2+M*g*\sin\theta)*$Mileage [Equation 2]

Accordingly, by using Equation 2, the weight (M) of the vehicle may be calculated using the relationship between the vehicle driving energy (E) calculated by the average fuel efficiency and the mileage and the mileage as shown in following Equation 3.

Vehicle weight $(M)=(E/\text{mileage}-f_2*v^2)/(g*f_0+g*\sin\theta)$ [Equation 3]

In addition, the required climbing energy calculation device 220 may use the uphill altitude (H) calculated by the driving altitude determination device, an average gradient (θ) of the uphill road, an average speed (v) and the weight (M) of the vehicle to calculate the average fuel efficiency required for the vehicle to travel along a remaining uphill road from the current driving altitude to the highest altitude as the required climbing energy.

To this end, the required climbing energy calculation device 220 may express the vehicle driving energy (E) calculated by Equation 2 with the uphill altitude (H) to which the vehicle must climb and the average gradient (θ) of the uphill road as following Equation 4.

Vehicle driving energy $(E)=(M*g*f_0+f_2*v^2+M*g*\sin\theta)*H/\sin\theta$ [Equation 4]

In addition, the climbing stack output calculation device 300 may include a battery available energy calculation device 310 configured to calculate available battery energy, which is capable of being supplied from a battery while the vehicle climbs the remaining uphill road, based on an SOC of the battery, a required stack energy calculation device 320 configured to calculate a remainder obtained by subtracting the available battery energy from the required climbing energy calculated by the climbing energy estimation device as required stack energy to be generated in the fuel cell stack, and a required stack output calculation device 330 configured to calculate a required stack output by dividing the required stack energy by an estimated time required to reach a maximum altitude when the vehicle travels at an average speed.

In this case, the battery available energy calculation device 310 may multiply the battery capacity (73.2 kWh) by the usable SOC among the total SOC of the battery to calculate the battery available energy (B) that can be supplied from the battery while climbing the remaining uphill road.

In addition, the required stack energy calculation device 320 may subtract the battery available energy (B) from the required climbing energy (E) required for climbing the remaining uphill road until the vehicle reaches the highest altitude, thereby obtaining the required stack energy (E−B).

In addition, the required stack output calculation device 330 may divide the required stack energy (E−B) by the estimated time required for the vehicle to climb to the highest altitude as shown in following Equation 5, thereby obtaining the required stack output to be generated in the fuel cell stack.

Required stack output$=(E-B)/\text{Estimated time}=(E-B)/(H/v/\sin\theta)$ [Equation 5]

As an example, when the battery SOC of a vehicle currently driving at an altitude of 900 meters on an uphill road in an altitude range of 400 to 1000 meters is 65%, and the average speed of the vehicle for 60 seconds is 72 kph, the average gradient of the uphill road is 2%, and the weight of the vehicle is 14 tons, the required climbing energy (E) of the vehicle may be calculated as about 163 MJ by Equation 4.

In addition, the battery available energy (B) may be calculated as about 158 MJ when the remainder except for the minimum SOC of 5% capable of preventing the battery from being discharged is used as the output of the vehicle.

Accordingly, the required stack energy (E−B), which is the remaining energy after excluding the energy that can be supplied from the battery available energy (B) among the required climbing energy (E) required for the vehicle to climb up to 1000 meters which is the highest altitude of the uphill road, may be calculated as 5 MJ.

The output of 35 kW calculated by Equation 5 may be calculated as the required stack output to be generated in the fuel cell stack so that the calculated required stack energy (E−B) is supplied to the vehicle.

Accordingly, while the vehicle travels on the remaining uphill road corresponding to the uphill altitude, only by allowing the fuel cell stack to generate 35 kW, the vehicle may reach the highest altitude of the uphill road while preventing the battery from being fully discharged. Accordingly, it is possible to reach the highest altitude of the uphill road even without excessive power generation in the fuel cell stack according to the state of the SOC of the battery while the vehicle travels on the uphill road.

In addition, the stack output determination device 400 may compare the required stack output calculated by the climbing stack output calculation device 300 with a basic stack output set to be generated in the fuel cell stack according to the degree of decrease in the battery SOC, and determine a lower value as a final stack output to be generated in the fuel cell stack.

To this end, the present disclosure may further include a stack output map in which a stack output to be generated in the fuel cell stack is mapped to a battery SOC and stored as a basic stack output. In this case, in the stack output map, the basic stack output may be set to increase as the battery SOC decreases. For example, in the stack output map of a hydrogen electric truck, when the battery SOC is 65%, the basic stack output is set to 58 kW, and when the battery SOC decreases, the basic stack output may be set to generate power up to 180 kW.

Accordingly, the stack output determination device 400 may compare the basic stack output derived from the stack output map with the required stack output calculated using the current battery SOC to determine a lower value as the final stack output.

That is, when the required stack output is greater than the basic stack output, the basic stack output may be determined as the final stack output, and when the required stack output is less than the basic stack output, the required stack output may be output as the final stack output. Accordingly, when the remaining uphill altitude is not high or the SOC of the battery is not significantly insufficient when the vehicle travels on the uphill road, the stack output may be lowered, thereby preventing fuel consumption to generate excessive stack output.

Next, with reference to FIGS. 5 and 6, an example in which the fuel efficiency improvement logic for comparing the required stack output and the basic stack output and determining the lower value as the final stack output is not applied and an example of applying the fuel efficiency improvement logic according to the embodiment of the present disclosure will be described. In this case, it is assumed that a vehicle travels on an uphill road reaching the maximum altitude of 1000 m through a point of 800 m from a current driving altitude of 600 m.

Figure 5:
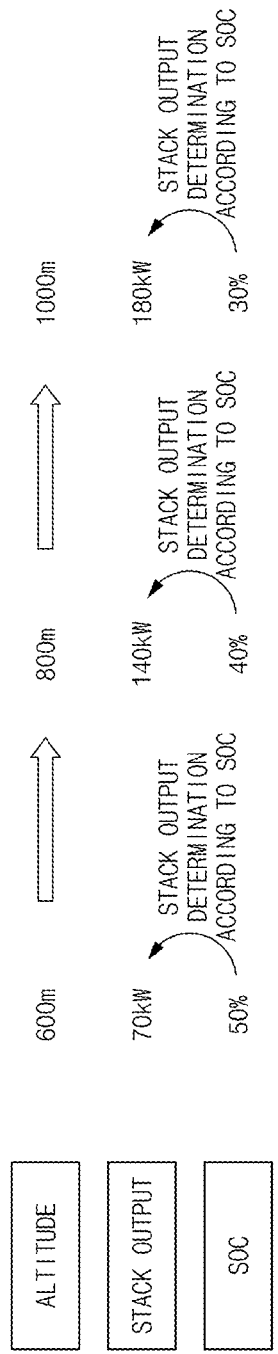
FIG. 5 is an exemplary diagram illustrating a stack output increase state when driving on a general uphill road to which fuel efficiency improvement logic according to an embodiment of the present disclosure is not applied.

First, in FIG. 5, which shows the case where the fuel efficiency improvement logic is not applied, when the battery SOC is 50% at the current driving altitude of 600 m, 70 kW, which is the basic stack output stored in the stack output map, is generated from the fuel cell stack. In addition, as the vehicle climbs the uphill road, the battery SOC is lowered to 40% at a current driving altitude of 800 m due to battery power consumption during climbing, and accordingly, the basic stack output is increased to 140 kW. Thereafter, when the vehicle reaches the highest altitude of 1000 m, the battery SOC is lowered to 30%, and the basic stack output is increased to 180 kW which is the maximum output of the fuel cell stack.

Accordingly, although the power consumption charged in the battery is expected to be reduced after reaching the highest altitude, the fuel cell stack generates an excessive stack output.

Figure 6:
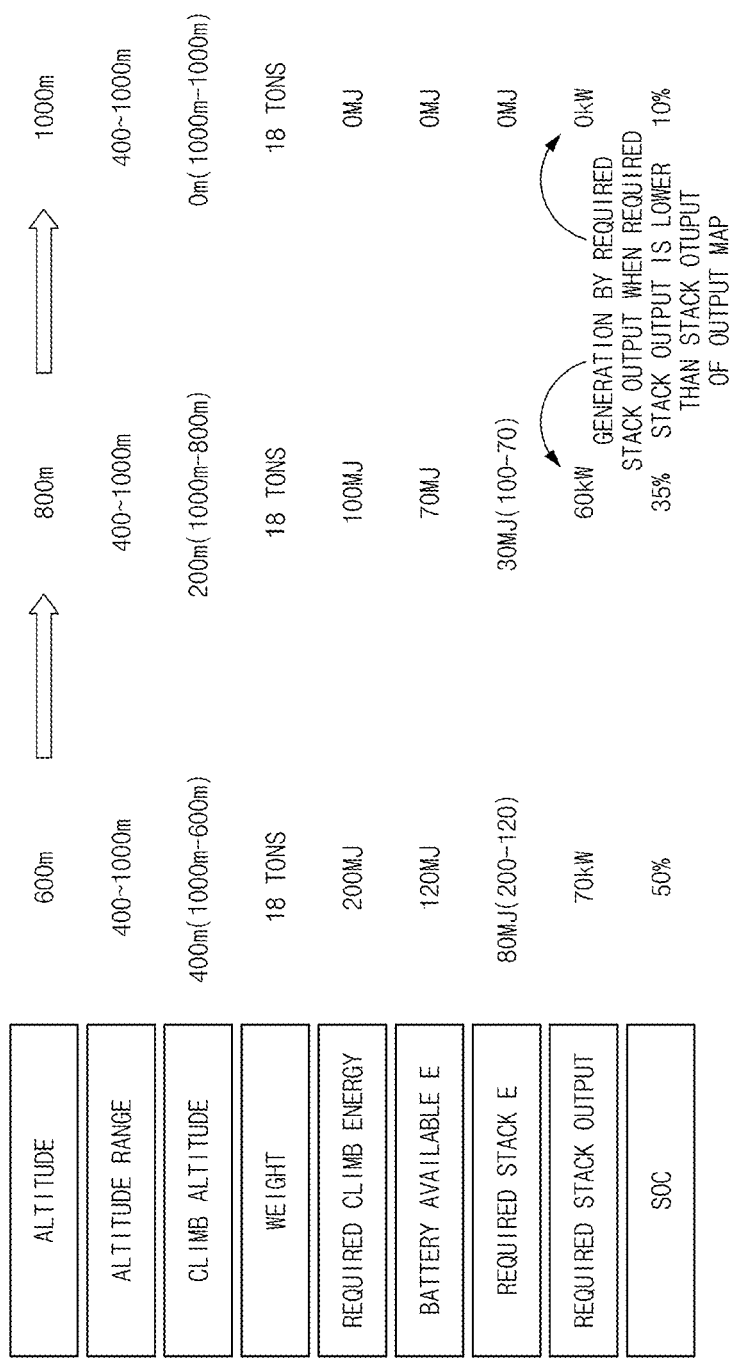
FIG. 6 is an exemplary diagram illustrating a calculation state of a stack required output after a fuel efficiency improvement logic according to an embodiment of the present disclosure is applied.

However, in FIG. 6 showing a case in which the fuel efficiency improvement logic according to the embodiment of the present disclosure is applied, it is possible to recognize that the vehicle is traveling on the uphill road in the altitude range of 400 m to 1000 m, and calculate the climbing altitude to which the vehicle is to travel from the current driving altitude to the highest altitude.

Accordingly, when the current driving altitude is 600 m, the driving altitude determination device 100 may calculate the climbing altitude of 400 m, and calculate the weight of the vehicle by using the average gradient of the currently driving uphill road and average fuel efficiency. In FIG. 6, the weight of the vehicle is set to 18 tons.

In addition, the climbing energy estimation device 200 may calculate the required climbing energy required for driving the uphill road up to the highest altitude by using the altitude difference of the uphill altitude, the weight of the vehicle, the average speed of the vehicle, and the average gradient of the uphill road, and in FIG. 6, the required climbing energy is calculated as 200 MJ.

In this case, like the case of FIG. 5, when the SOC of the battery is 50%, 120 MJ may be supplied from the battery, so that only the insufficient 80 MJ may be calculated as the required stack energy. By dividing the calculated required stack energy by the estimated climbing time calculated to be required to climb to the highest altitude, 70 kW may be calculated as the required stack output.

In addition, the stack output determination device 400 may compare the required stack output with the basic stack output when the battery SOC is 50%, and because the values are the same, 70 kW may be determined as the final stack output.

Thereafter, when the vehicle continues to climb and reaches the current driving altitude of 800 m, the uphill altitude may be 200 m and the required stack energy may be calculated as 100 MJ. In this case, the battery SOC is reduced to 35%, but the climb altitude is also reduced, so the required stack energy required to reach the highest altitude is also reduced to 100 MJ.

Accordingly, because the available energy that can be supplied from the battery is 70 MJ when the battery SOC is 35%, only 30 MJ, which is a shortage, may be calculated as the required stack energy. In addition, when the calculated required stack energy is divided by the estimated climbing time required to climb to the highest altitude, only 60 kW may be calculated as the required stack output.

By comparing the calculated required stack output with the basic stack output when the battery SOC is 35%, the lower required stack output may be determined as the final stack output. Accordingly, even though the battery SOC is lowered from 50% to 35%, the stack output may be rather reduced as the climbing altitude to the highest altitude is reduced, so that the fuel efficiency may be improved.

That is, as the current driving altitude of the vehicle increases, the battery SOC decreases, but the driving altitude and the estimated climbing time for reaching the highest altitude are also lowered together, so that the output to be supplemented from the fuel cell stack for the vehicle's climbing is also reduced.

In addition, when the current driving altitude of the vehicle reaches 1000 m, the climbing altitude becomes 0 m, so that the required stack energy becomes 0 MJ, so not only the stack output but also the battery output is not used for the climbing. As described above, after reaching the highest altitude of the uphill road, the vehicle may travel on a flat or downhill road, so the battery may be charged by generating electric power required for driving the vehicle even without generating excessive stack output, thereby improving fuel efficiency of the vehicle.

Figure 7:
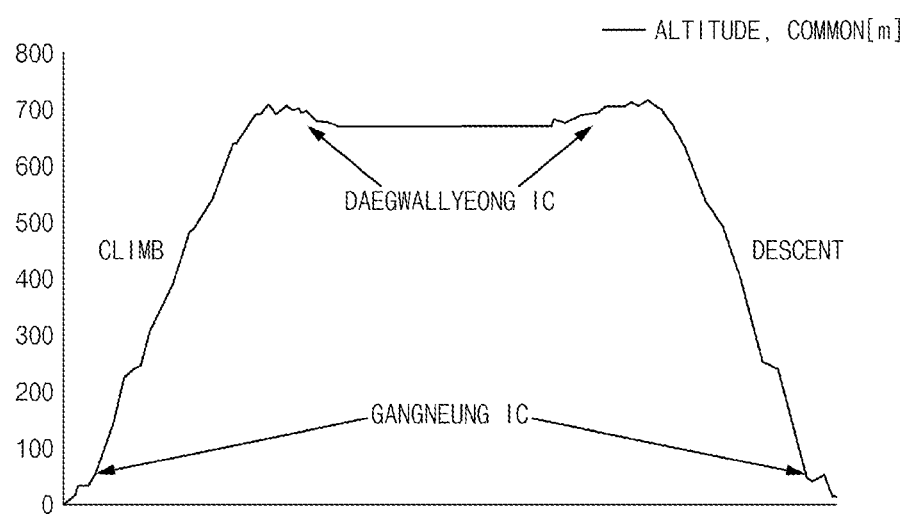
FIG. 7 is an exemplary graph illustrating a change in driving altitude when driving on an uphill or downhill road according to an embodiment of the present disclosure.
Figure 8:
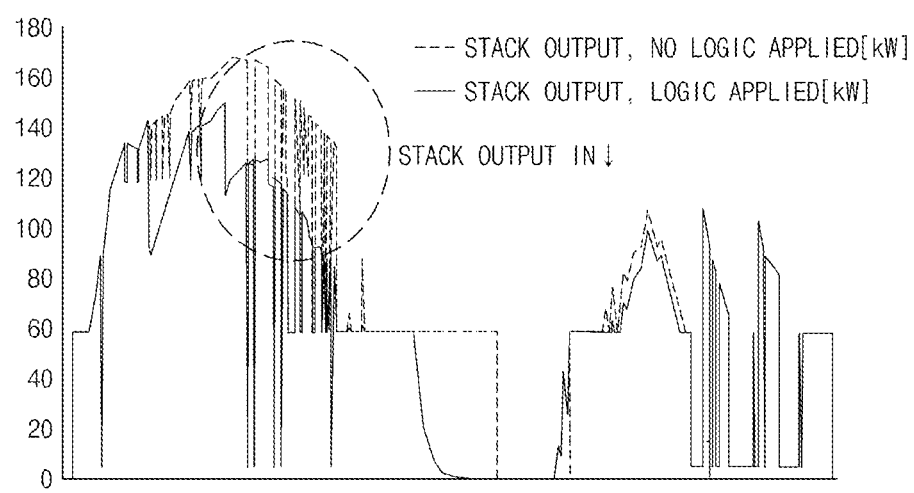
FIG. 8 is an exemplary graph illustrating a simulation result of a stack output that is changed according to whether a fuel efficiency improvement logic according to an embodiment of the present disclosure is applied.

FIG. 7 shows, as an example of an uphill road in which the driving altitude changes, an uphill road and a downhill road from Gangneung IC to Daegwallyeong IC. A simulation result of the stack output generated from the fuel cell stack in the case of driving such an uphill road is shown in FIG. 8. It may be understood that the stack output in the case where the fuel efficiency improvement logic according to the present disclosure is applied is reduced compared to the stack output in the case where the fuel efficiency improvement logic is not applied even when the vehicle travels on the same uphill road. In particular, it may be confirmed that the difference in stack output is large when the battery SOC is much lowered near the highest altitude.

Next, a method of improving the fuel efficiency of a fuel cell vehicle in uphill and downhill driving according to another embodiment of the present disclosure will be described with reference to FIGS. 9 and 10.

Figure 9:
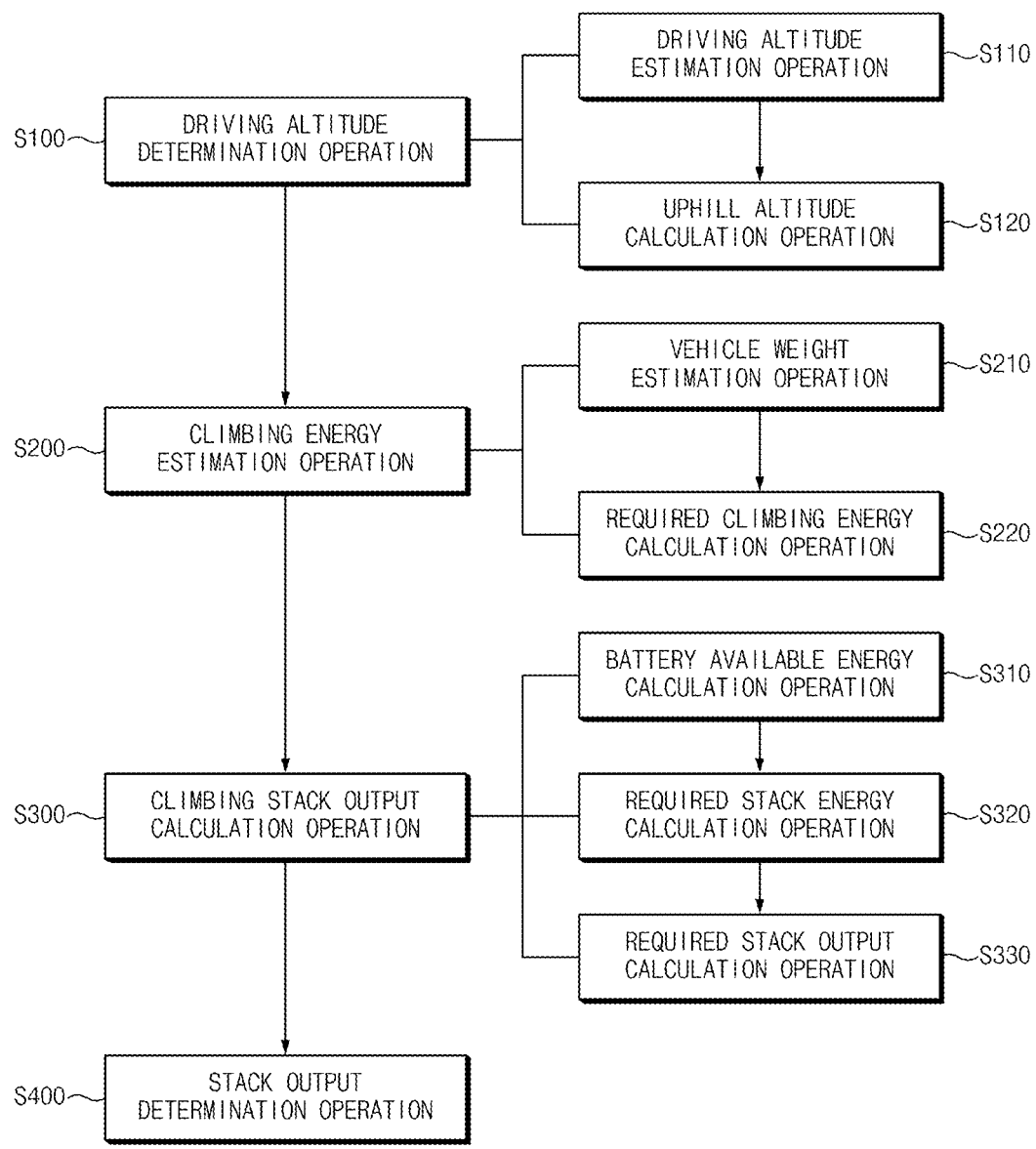
FIG. 9 is a flowchart illustrating a method of improving a climbing fuel efficiency of a fuel cell vehicle according to another embodiment of the present disclosure.
Figure 10:
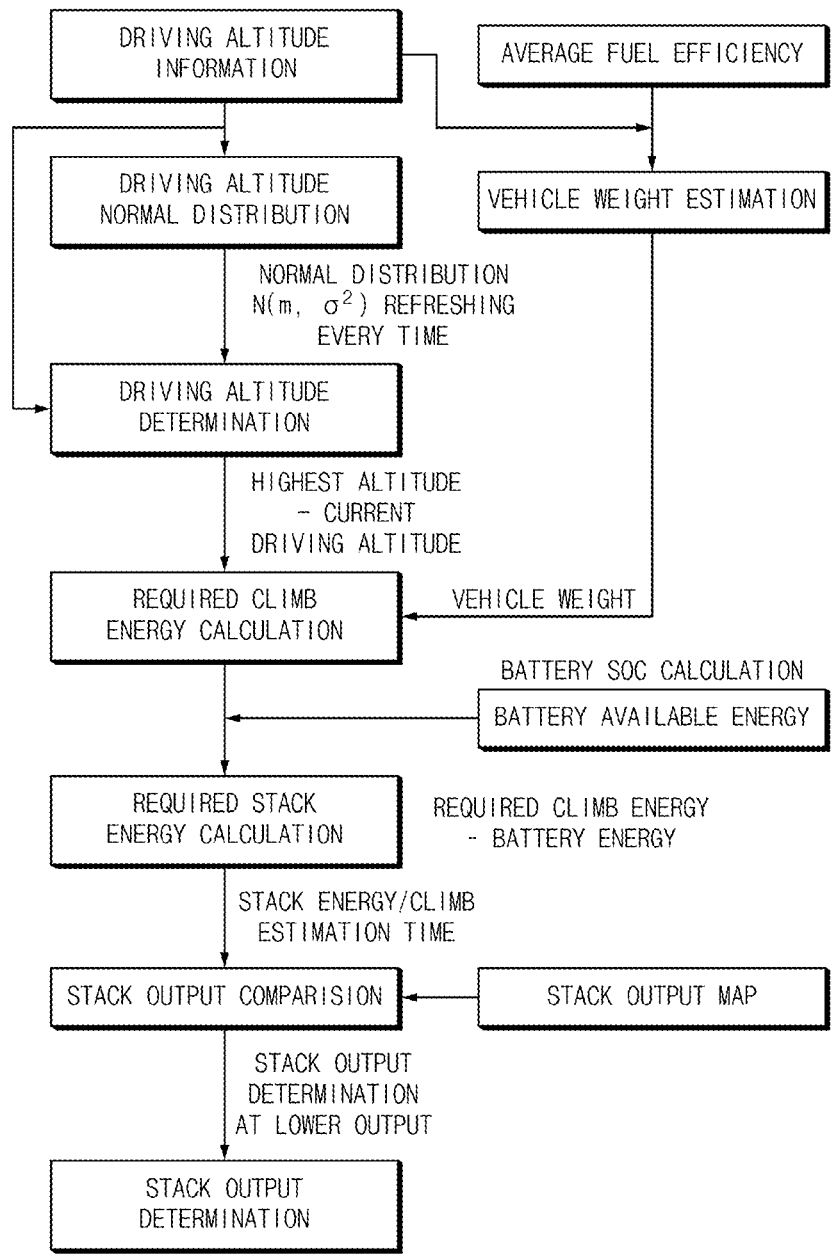
FIG. 10 is a flowchart illustrating a process of executing fuel efficiency improvement logic according to another embodiment of the present disclosure.

Referring to FIGS. 9 and 10, a method of improving the fuel efficiency of a fuel cell vehicle in uphill and downhill driving according to another embodiment of the present disclosure may include a driving altitude determination operation S100 of estimating an uphill altitude at which a vehicle is to travel up to a highest altitude based on a current driving altitude on an uphill road on which the vehicle travels, and a final stack output determination operation of determining a stack output to be generated in a fuel cell stack in order for the vehicle to travel to the highest altitude based on a remaining SOC of a battery and the uphill altitude.

In this case, the final stack output determination operation may include a climbing energy estimation operation S200 of calculating driving energy required to travel on a remaining uphill road corresponding to the uphill altitude by using a weight of the vehicle as required climbing energy, a climbing stack output calculation operation S300 of calculating a remainder of the required climbing energy, excluding battery available energy that is able to be supplied from the battery, as required stack energy, and calculating a required stack output to be generated in the fuel cell stack for travelling on the uphill road by using the required stack energy, and a stack output determination operation S400 of comparing the calculated required stack output with a basic stack output set to be generated in the fuel cell stack in response to a decrease in an SOC of the battery while travelling on the remaining uphill road, and determining a lower value as a final stack output to be generated in the fuel cell stack.

The driving altitude determination operation S100 may include a driving altitude estimation operation S110 of estimating a level at which the vehicle travels in an altitude range of the uphill road by using a current driving altitude of the vehicle traveling on the uphill road and an uphill altitude calculation operation S120 of calculating an uphill altitude at which the vehicle is to travel from the current driving altitude to a highest altitude on the uphill road.

In this case, in the driving altitude estimation operation S110, it is possible to acquire the current driving altitude of the vehicle from location information of a navigation system (AVN) obtained by using GPS information, or acquire the current driving information of the vehicle based on a change in atmospheric pressure information measured by an atmospheric pressure sensor in the vehicle.

In addition, in the driving altitude estimation operation S110, it is possible to estimate the level at which the vehicle travels in the altitude range of the uphill road by using a normal distribution of altitude information generated based on a number of current driving altitude samples obtained during a specified period.

To this end, in the driving altitude estimation operation S110, a normal distribution of altitude information having an average of "m" and a standard deviation of σ may be calculated by using a plurality of current altitude information samples acquired during a specified time period as shown in FIG. 4. In this case, an altitude corresponding to 3-sigma in the normal distribution of the altitude information of FIG. 4 may be assumed as the highest altitude of the uphill road. Therefore, the difference in altitude between the current altitude information of the vehicle and the altitude corresponding to the 3-sigma is the climbing altitude to which the vehicle traveling on the uphill road must climb further to reach the highest altitude.

In addition, in the uphill altitude calculation operation S120, the difference obtained by subtracting the current driving altitude of the vehicle from the highest altitude assumed in the driving altitude estimation operation may be calculated as the climbing altitude to which the vehicle traveling on the uphill road must travel further from the current location to the highest altitude on the uphill road. That is, the climbing altitude means a difference between the current altitude of the vehicle and the highest altitude to which the vehicle can climb.

In addition, in the driving altitude determination operation S100, it is possible to establish an altitude information database by setting and storing an altitude range including the lowest and highest altitudes of the uphill road on which the vehicle travels based on the past driving records of the vehicle traveling on the uphill road.

As described above, by establishing the altitude information database by limiting the lowest and highest altitudes of the uphill road on which the vehicle travels, the uphill altitude may be calculated by using the database, and the uphill energy required for the vehicle to drive from the current driving altitude to the highest altitude may be calculated. Accordingly, the embodiments may be suitable for determining the stack output of the fuel cell vehicle such as a bus or a truck that constantly and repeatedly travels a specified driving route that includes a charging station.

In addition, the climbing energy estimation operation S200 may include a vehicle weight estimation operation S210 of estimating a weight of the vehicle by using a gradient of the uphill road and an average fuel efficiency of the vehicle and a required climbing energy calculation operation S220 of calculating the driving energy required for the vehicle having the estimated weight to reach a highest altitude by traveling on the remaining uphill road at the current driving altitude as the required climbing energy.

In this case, in the vehicle weight estimation operation S210, it is possible to estimate the weight of the vehicle by using the average gradient of the uphill road and the average fuel efficiency calculated by dividing the amount of hydrogen fuel consumed by the mileage.

In this case, the vehicle driving energy (E) consumed for driving the vehicle may be calculated as 50% of the hydrogen consumption energy generated by consuming hydrogen fuel, or be calculated by multiplying the value obtained by multiplying the average fuel efficiency by the mileage by 0.5.

In addition, the vehicle driving energy (E) may be expressed as a relationship between the weight (M) of the vehicle and the mileage. That is, the vehicle driving energy (E) may be calculated by multiplying the sum of the rolling resistance proportional to the weight (M) of the vehicle, the air resistance proportional to the speed (v) of the vehicle, and the inclination resistance proportional to the weight (M) of the vehicle and the gradient (θ) of the vehicle by the mileage.

Accordingly, in the vehicle weight estimation operation S210, it is possible to calculate the weight (M) of the vehicle by dividing a value by a remaining component excluding the weight (M) of the vehicle among the rolling resistance and the inclination resistance, wherein the value is obtained by subtracting the air resistance after dividing the vehicle driving energy (E) calculated based on the average fuel efficiency and the mileage of the vehicle by the mileage.

That is, in the vehicle weight estimation operation S210, the weight (M) of the vehicle may be calculated using the relationship between the mileage and the vehicle driving energy (E) calculated by the average fuel efficiency and the mileage.

In addition, in the required climbing energy calculation operation S220, it is possible to use the uphill altitude (H) calculated in the driving altitude determination operation, the average gradient (θ) of the uphill road, the average speed (v) and the weight (M) of the vehicle to calculate the vehicle driving energy required for the vehicle to travel along the remaining uphill road from the current driving altitude to the highest altitude as the required climbing energy.

To this end, in the required climbing energy calculation operation S220, the mileage calculated by dividing the uphill altitude (H) by the average gradient (θ) of the uphill road may be multiplied by the sum of the rolling resistance, the air resistance and the inclination resistance, so that it is possible to calculate the required climbing energy required to travel on the remaining uphill road until the vehicle reaches the highest altitude.

In addition, in the climbing stack output calculation operation S300, a battery available energy calculation operation S310 of calculating available battery energy, which is capable of being supplied from a battery while the vehicle climbs the remaining uphill road, based on an SOC of the battery, a required stack energy calculation operation S320 of calculating a remainder obtained by subtracting the available battery energy from the required climbing energy calculated by the climbing energy estimation operation as required stack energy to be generated in the fuel cell stack, and a required stack output calculation operation S330 of calculating a required stack output by dividing the required stack energy by an estimated time required to reach a maximum altitude when the vehicle travels at an average speed.

In this case, in the battery available energy calculation operation S310, it is possible to calculate the battery available energy (B) that can be supplied from the battery while climbing the remaining uphill road by multiplying the usable SOC of the total SOC of the battery by the battery capacity of 73.2 kWh.

In addition, in the required stack energy calculation operation S320, it is possible to calculate the required stack energy (E-B) by subtracting the battery available energy (B) from the required climbing energy (E) required for the vehicle to climb the remaining uphill road up to the highest altitude.

In addition, in the required stack output calculation operation S330, it is possible to calculate the required stack energy to be generated in the fuel cell stack by dividing the required stack energy (E-B) by the estimated time required for the vehicle to climb to the highest altitude.

In addition, in the stack output determination operation S400, the required stack output calculated in the climbing stack output calculation operation may be compared with the basic stack output set to be generated in the fuel cell stack according to the degree of decrease in the battery SOC, thereby determining a lower value as the final stack output to be generated in the fuel cell stack.

To this end, a stack output map stored as a basic stack output by mapping a stack output to be generated in the fuel cell stack to a battery SOC may be provided. In this case, in the stack output map, the basic stack output may be set to increase as the battery SOC decreases.

Accordingly, in the stack output determination operation S400, it is possible to determine a lower value as the final stack output by comparing the required stack output calculated using the current battery SOC with the basic stack output derived from the stack output map.

As described above, by determining the lower output of the required stack output and the final stack output as the final stack output, the stack output may be lowered when the remaining climb altitude is not high or the SOC of the battery is not significantly insufficient for the vehicle to climb the hill, thereby preventing the consumption of hydrogen fuel.

According to the embodiments of the present disclosure, it is possible to calculate an appropriate stack output to be generated from a fuel cell stack based on the SOC of a battery as well as an uphill altitude at which the vehicle traveling on the uphill road has to travel further to reach the highest altitude when determining the degree of the stack output generated from the fuel cell stack when driving on the uphill road, and prevent fuel consumption from increasing to generate excessive stack output while driving on an uphill road or the durability of the fuel cell stack from being deteriorated.

In addition, according to the embodiments of the present disclosure, it is possible to minimize the increase in the amount of heat generated by minimizing the high output power generation in the fuel cell stack even when a vehicle drives on an uphill road that requires more output than when the vehicle drives on a flat or downhill road. Accordingly, in addition, it is possible to reduce the degree of noise felt by the driver by reducing the degree of operation of a cooling component.

In addition, various effects that are directly or indirectly understood through the present disclosure may be provided.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A device for improving a fuel efficiency of a fuel cell vehicle in uphill and downhill driving, the device comprising:
    a driving altitude determination device configured to estimate an uphill altitude at which a vehicle is to travel up to a highest altitude based on a current driving altitude on an uphill road on which the vehicle travels; and
    a final stack output determination device configured to determine a stack output to be generated in a fuel cell stack in order for the vehicle to travel to the highest altitude based on a remaining state of charge, SOC, of a battery and the uphill altitude.

2. The device of claim 1, wherein the final stack output determination device includes:
    a climbing energy estimation device configured to calculate driving energy required to travel on a remaining uphill road corresponding to the uphill altitude based on a weight of the vehicle as required climbing energy;
    a climbing stack output calculation device configured to calculate a remainder of the required climbing energy, excluding battery available energy that is able to be supplied from the battery, as required stack energy, and
        calculate a required stack output to be generated in the fuel cell stack for travelling on the uphill road; and
    a stack output determination device configured to
        compare the calculated required stack output with a basic stack output set to be generated in the fuel cell stack in response to a decrease in an SOC of the battery while travelling on the remaining uphill road, and
        determine a lower value between the calculated required stack output and the basic stack output as a final stack output to be generated in the fuel cell stack.

3. The device of claim 2, wherein the climbing energy estimation device includes:
    a vehicle weight estimation device configured to estimate the weight of the vehicle based on a gradient of the uphill road and an average fuel efficiency of the vehicle; and
    a required climbing energy calculation device configured to calculate the driving energy required for the vehicle having the estimated weight to reach the highest altitude by traveling on the remaining uphill road at the current driving altitude as the required climbing energy.

4. The device of claim 3, wherein the vehicle weight estimation device is configured to estimate the weight of the vehicle based on altitude information of the uphill road on which the vehicle travels and the average fuel efficiency of the vehicle traveling on the uphill road.

5. The device of claim 3, wherein the vehicle weight estimation device is configured to calculate the weight of the vehicle by dividing a value by a remaining component excluding the weight of the vehicle among a rolling resistance and an inclination resistance, wherein the value is obtained by subtracting an air resistance after dividing the vehicle driving energy calculated based on the average fuel efficiency and a mileage of the vehicle by the mileage.

6. The device of claim 3, wherein the required climbing energy calculation device is configured to use the uphill altitude calculated by the driving altitude determination device, an average gradient of the uphill road, an average speed and the weight of the vehicle to calculate a vehicle driving energy required for the vehicle to travel along a remaining uphill road from the current driving altitude to the highest altitude as the required climbing energy.

7. The device of claim 2, wherein the vehicle traveling on the uphill road is driven along a route that includes a charging station.

8. The device of claim 2, wherein the climbing stack output calculation device includes:
    a battery available energy calculation device configured to calculate available battery energy, which is capable of being supplied from the battery while the vehicle climbs the remaining uphill road, based on the SOC of the battery;
    a required stack energy calculation device configured to calculate a remainder obtained by subtracting the available battery energy from the required climbing energy calculated by the climbing energy estimation device as the required stack energy to be generated in the fuel cell stack; and
    a required stack output calculation device configured to calculate the required stack output by dividing the required stack energy by an estimated time required to reach the highest altitude when the vehicle travels at an average speed.

9. The device of claim 1, wherein the driving altitude determination device includes:
    a driving altitude estimation device configured to estimate a level at which the vehicle travels in an altitude range of the uphill road based on the current driving altitude of the vehicle traveling on the uphill road; and
    an uphill altitude calculation device configured to calculate the uphill altitude at which the vehicle is to travel from the current driving altitude to the highest altitude on the uphill road.

10. The device of claim 9, wherein the driving altitude estimation device is configured to
    acquire the current driving altitude of the vehicle from location information of a navigation system obtained by using GPS information, or
    acquire current driving information of the vehicle based on a change in atmospheric pressure information measured by an atmospheric pressure sensor in the vehicle.

11. The device of claim 9, wherein the driving altitude estimation device is configured to estimate the level at which the vehicle travels in the altitude range of the uphill road based on a normal distribution of altitude information generated based on a number of current driving altitude samples obtained during a specified period.

12. A method of improving a fuel efficiency of a fuel cell vehicle in uphill and downhill driving, the method comprising:
    estimating, by a driving altitude determination device, an uphill altitude at which the vehicle is to travel up to a highest altitude based on a current driving altitude on an uphill road on which the vehicle travels; and
    determining, by a final stack output determination device, a stack output to be generated in a fuel cell stack in order for the vehicle to travel to the highest altitude based on a remaining state of charge, SOC, of a battery and the uphill altitude.

13. The method of claim 12, wherein the determining of the stack output includes:
    calculating, by a climbing energy estimation device, driving energy required to travel on a remaining uphill road corresponding to the uphill altitude based on a weight of the vehicle as required climbing energy;

calculating, by a climbing stack output calculation device, a remainder of the required climbing energy, excluding battery available energy that is able to be supplied from the battery, as required stack energy, and calculating, by the climbing stack output calculation device, a required stack output to be generated in the fuel cell stack for travelling on the uphill road; and comparing, by a stack output determination device, the calculated required stack output with a basic stack output set to be generated in the fuel cell stack in response to a decrease in SOC of the battery while travelling on the remaining uphill road, and determining, by the stack output determination device, a lower value between the calculated required stack output and the basic stack output as a final stack output to be generated in the fuel cell stack.

14. The method of claim 13, wherein the estimating of the uphill altitude includes:

estimating, by a driving altitude estimation device, a level at which the vehicle travels in an altitude range of the uphill road based on the current driving altitude of the vehicle traveling on the uphill road; and calculating, an uphill altitude calculation device, the uphill altitude at which the vehicle is to travel from the current driving altitude to the highest altitude on the uphill road.

15. The method of claim 14, wherein the estimating of the level includes:

acquiring, by the driving altitude estimation device, the current driving altitude of the vehicle from location information of a navigation system obtained by using GPS information, or acquiring, by the driving altitude estimation device, current driving information of the vehicle based on a change in atmospheric pressure information measured by an atmospheric pressure sensor in the vehicle.

16. The method of claim 14, wherein the estimating of the level includes:

estimating, by the driving altitude estimation device, the level at which the vehicle travels in the altitude range of the uphill road by using a normal distribution of altitude information generated based on a number of current driving altitude samples obtained during a specified period.

17. The method of claim 13, wherein the calculating of the driving energy includes:

estimating, by a vehicle weight estimation device, the weight of the vehicle based on a gradient of the uphill road and an average fuel efficiency of the vehicle; and calculating, by a required climbing energy calculation device, the driving energy required for the vehicle having the estimated weight to reach the highest altitude by traveling on the remaining uphill road at the current driving altitude as the required climbing energy.

18. The method of claim 17, wherein the estimating of the weight of the vehicle includes:

calculating, by the vehicle weight estimation device, the weight of the vehicle by dividing a value by a remaining component excluding the weight of the vehicle among a rolling resistance and an inclination resistance, wherein the value is obtained by subtracting an air resistance after dividing the vehicle driving energy calculated based on the average fuel efficiency and a mileage of the vehicle by the mileage.

19. The method of claim 17, wherein the calculating of the driving energy includes:

calculating, by the required climbing energy calculation device, a vehicle driving energy required for the vehicle to travel along a remaining uphill road from the current driving altitude to the highest altitude as the required climbing energy by using the uphill altitude calculated by the estimating of the uphill altitude, an average gradient of the uphill road, an average speed and the weight of the vehicle.

20. The method of claim 13, wherein the calculating of the remainder of the required climbing energy includes:

calculating, by a battery available energy calculation device, available battery energy, which is capable of being supplied from the battery while the vehicle climbs the remaining uphill road, based on the SOC of the battery;

calculating, by a required stack energy calculation device, a remainder obtained by subtracting the available battery energy from the required climbing energy calculated by the climbing energy estimation device as the required stack energy to be generated in the fuel cell stack; and calculating, by a required stack output calculation device, the required stack output by dividing the required stack energy by an estimated time required to reach the highest altitude when the vehicle travels at an average speed.

* * * * *